Figure 1:
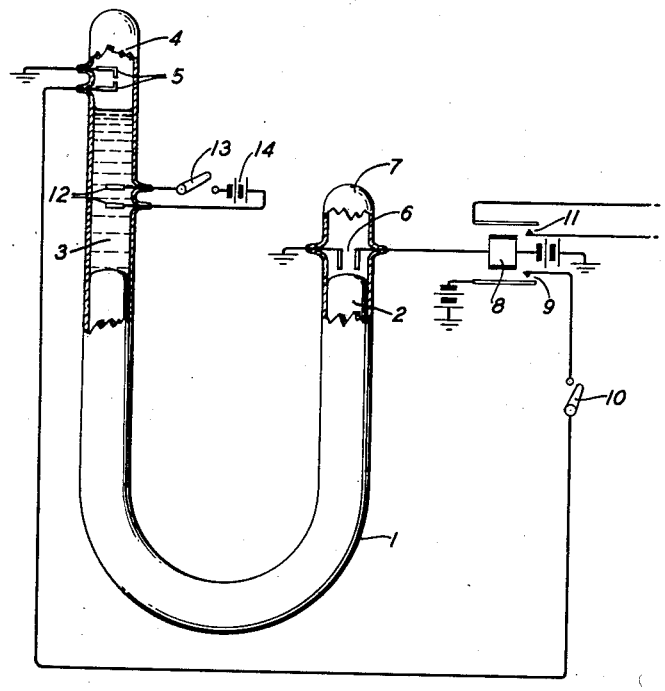

May 9, 1939.  J. W. DEHN ET AL  2,157,890
SWITCHING DEVICE
Filed July 16, 1937

INVENTORS: J. W. DEHN
O. MYERS
BY
ATTORNEY

Patented May 9, 1939

2,157,890

UNITED STATES PATENT OFFICE 2,157,890

SWITCHING DEVICE

Joseph W. Dehn, Great Neck, and Oscar Myers, Mount Vernon, N. Y., assignors to Bell Telephone Laboratories, Incorporated, New York, N. Y., a corporation of New York Application July 16, 1937, Serial No. 153,898

6 Claims. (Cl. 175—320)

This invention relates to switching devices and particularly to relays having slow acting characteristics.

An object of this invention is to provide a relay of this type in which the operating time may be readily adjusted to any one of a plurality of desired time intervals and in which the said time intervals may be held within very accurate and uniform limits throughout the life of the relay.

Heretofore switching devices of this type have been employed in which mercury in tubes is used as the contact means to establish electrical connections. In such devices a mercury column may be enclosed in a U-shaped tube and made to shift in one direction or the other to open or close the circuit connections. One means of shifting the mercury column may consist of having a solution of hydrochloric acid provided in one end of the tube and having an electric current pass through this solution. The resulting electrolytic effect causes hydrogen and chlorine to be evolved both of which are insoluble in the solution from which they are produced. If this tube is illuminated or exposed to light, the hydrogen and chlorine recombine to form hydrochloric acid which is immediately absorbed by the solution. If the effect of light is stronger than that of the electric current the gaseous mass diminishes while in the opposite case it increases. In this manner variations in the mercury level may be obtained to close and open circuits.

A feature of the present invention is to provide a slow-to-operate relay of this mercury switching type or switching devices using other substances as the switching means in which the operating time is a function of the voltage supply and in which the restoring time is practically instantaneous. This relay may take the form of a sealed U-shaped tube containing mercury and in one arm of which there is placed, above the mercury level, a diluted solution of an electrolyte such as sulphuric acid or sodium sulphate, or any other solution which forms hydrogen and oxygen when electrolyzed by a circuit connection made therethrough. Above this solution the terminals of an electric circuit may be sealed into the tube. In the other arm the terminals of a circuit operating a relay may be inserted in position to be closed by a rise of the mercury in this arm. The relay when operated in turn may close a circuit for the terminals in the first-mentioned arm of the tube. The circuit having terminals sealed into the tube in position for electrolyzing the solution may be closed to cause hydrogen and oxygen gas to form in the upper part of the arm above the solution. The pressure of this gas when a sufficient amount has been produced will drive the mercury down through this arm and up into the other to cause a connection to be closed between the terminals of the relay. This causes the relay to operate and close a circuit for the terminals located where the gas is found to explode this gas. This forms water vapor which condenses and restores the solution. As the gas is exploded the mercury returns to its normal level and the circuit for the relay is opened, opening the circuit for exploding the gas. These operations are then repeated at intervals. The operation of the relay may, therefore, be regulated to take place as the direct function of the voltage applied to this solution and the amount of gas required for closing the circuit for the relay, while the restoring time may be practically instantaneous.

Another form of the applicants' invention may consist of a similar tube arrangement where the mercury column is omitted and the electrolyte itself acts on glass bellows to cause the delayed operation of circuit controlling contacts.

Figure 2:
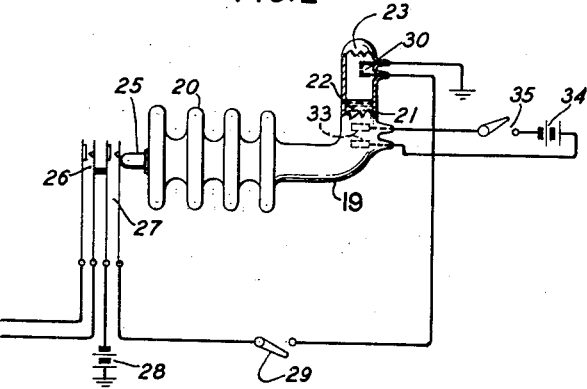

The invention has been illustrated in the accompanying drawing in which:

Fig. 1 shows a preferred form of the applicants' invention applied to a U-shaped tube; and Fig. 2 shows a modified form of the applicants' invention applied to a tube provided with a glass bellows.

Referring now to the drawing and particularly to Fig. 1, 1 is a U-shaped glass tube sealed at both ends, 2 is liquid mercury extending up through the two legs of the glass tube. In the left-hand leg of the tube above the mercury level is a diluted solution 3 of an electrolyte such as sulphuric acid or sodium sulphate or any other solution of this type which may form hydrogen or oxygen when electrolyzed by a circuit connection made therethrough. Above this solution is the chamber 4 in which there is normally no solution or gas present. In this chamber 4 terminals 5 are sealed into the tube and spaced a short distance apart. Similar terminals 6 are placed in the chamber 7 above the mercury level in the right-hand end of the tube 1 and this chamber 7 normally does not contain any solution or gas of any kind. One of the terminals 6 is connected to ground and the other through the winding of relay 8 to battery. This relay has an armature 9 connected to battery and a contact that may be closed to this armature 9 when the relay 8 is operated. This contact is connected through a switch 10 to one of the terminals 5, while the other terminal is connected to ground. The relay 8 may be provided with other armatures and contacts such as 11 that may be operated on the energization of the relay to control any desired circuit connections. In the space occupied by the solution are sealed terminals 12 connected in a circuit through a switch 13 to a battery 14.

The operation of this device is as follows: The switches 10 and 13 may be closed to start the device operating. The closure of the switch 13 causes current to pass between the terminals 12 from the battery 14 and this causes the solution 3 to be electrolyzed to form hydrogen and oxygen gas which collects in the chamber 4. This gas, when a sufficient amount has been produced, drives the mercury column down through the left-hand arm and up into the right-hand arm of the tube to cause a connection to be closed between the terminals 6. This closes the circuit for relay 8 which now operates and closes the circuit through the contacts 11 to control any desired circuit connection. This relay also closes the connection between the armature 9 and its associated contact to close the circuit from battery through this armature and contact, switch 10 through terminals 5 to ground. This causes the gas in the chamber 4 to explode. This gas then forms a water vapor which condenses and restores to the solution 3. As soon as the gas is exploded the mercury column returns to its normal level and the circuit for relay 8 is opened at contacts 6. Relay 8 thereby releases, opening the circuit through contacts 5. As soon as this takes place hydrogen and oxygen gas is again formed in the chamber 4 and the operations just described are repeated.

It is readily seen that the volume of the chamber 4 may be of any desired value and the voltage of the battery 14 may be accurately regulated, while the level of the mercury column may be also varied to vary the distance between the level of the mercury in the right-hand leg of the tube and the contact 6 so that a certain fixed time interval will elapse before sufficient hydrogen and oxygen has been formed in the chamber 4 to cause the mercury column to shift to close the contacts 6. Relay 8 will, therefore, operate as a direct function of the voltage of the battery 14 and the other variables mentioned, to take place at fixed, uniform and accurately established intervals of time. It should be noted also that the explosion of the hydrogen and oxygen in the chamber 4 will take place practically instantaneously after the operation of relay 8 so that the time interval during which the connection through the contacts at 11 is closed may be accurately determined.

Referring now to the modified form of the applicant's invention as disclosed in Fig. 2 an L-shaped glass tube 19 may be provided having a horizontal bellows-shaped portion 20 and an upright portion 21. The bellows-shaped portion and a part of the upright portion are filled with a solution 22 of the same or similar substance as the solution 3 in Fig. 1. At the left-hand end of portion 20 any suitable insulation stud 25 may be provided to close connections between the contacts 26 for circuits for any suitable purpose and also connections between contacts 27 for the operation of the device. A circuit connection through the contact 27 extends from battery 28, contacts 27, switch 29 to one of the contacts 30 spaced some distance apart and sealed in the chamber 23, while the other contact of the set 30 is connected to ground. In the portion 20 are sealed contacts 33 connecting a circuit over a battery 34 and a switch 35.

The operation of this device is as follows: To start the operation of the device the switches 29 and 35 are closed. The closure of the switch 35 completes the circuit between the contacts 33 from the battery 34 which causes the solution 21 to electrolyze and form a gas comprising oxygen and hydrogen in the chamber 23. When a certain amount of this gas has been produced it will extend the bellows portion 20 so that the stud 25 will close the connections between the contacts 26 and between the contacts 27. Closure of the connections between contacts 26 controls any desired circuit connection and the closure of the connection between contacts 27 establishes a circuit from battery over these contacts, switch 29 and across the terminals 30 in the chamber 23. This causes the hydrogen and oxygen to explode and thereby permits the bellows to return to normal condition to open the connections between contacts 26 and between contacts 27. The opening of the connection between contacts 27 opens the circuit through contacts 30 and the functions described will then be repeated.

It will readily be seen that the volume of the chamber 23 may readily be regulated and the voltage of the battery 34 may be accurately adjusted to cause the bellows to close the connections at contacts 26 and 27 at certain fixed intervals. The closure of the contacts 26 will, therefore, in this case also be a direct function of the voltage of battery 34. In this modified form of the applicants' invention, therefore, no mercury column is required.

What is claimed is:

1. An electric switch comprising a circuit and means for closing said circuit for a short period at fixed intervals, said means including a closed glass vessel containing a solution for producing an explosive gas as an electrolytic effect and a mercury column, and circuit means for causing a certain quantity of said gas to be produced in said vessel by said solution, said vessel being arranged so that said gas causes a certain movement of the mercury column and another circuit means controlled by said mercury column when it has moved a fixed distance to cause the explosion of said gas and to colse said first-mentioned circuit for a short period.

2. An electric switch comprising a U-shaped tube having the upper portion of one leg containing a solution capable of being electrolytically decomposed into an explosive gas and the lower portion of the legs containing a mercury column, a first electric circuit including a relay and terminals in the upper portion of the other leg of said tube above the mercury column, a second electric circuit controlled by said relay and including terminals in the upper portion of the first leg above the solution, a third electric circuit for decomposing the solution to form a certain quantity of explosive gas in the upper portion of the first leg sufficient to force the mercury column into said other leg to close said first circuit to operate said relay for the closure thereby of said second circuit to explode the gas in the first leg when said certain quantity has been produced.

3. An electric switch comprising a U-shaped glass tube closed at each end, a solution of sulphuric acid or sodium sulphate in one leg of said tube, mercury in the lower portion of the legs of said tube, a first circuit including contacts embedded in the other leg of said tube above the mercury in said tube, a relay, a winding therefor and a battery supply in series therewith, a second circuit including contacts embedded in said first-mentioned leg of said tube above the solution in in said leg, contacts controlled by said relay and a battery supply in series therewith, and a third circuit including contacts immersed in said solution, a switch and a battery supply in series, said parts being so arranged that when said switch is closed a gas composing two parts of hydrogen and one part of oxygen is formed by electrolization of said solution in the space of said tube above the upper surface of said solution so that when a certain amount of gas has been formed, the mercury is forced further up into said other leg to close an electric connection between the contacts of said first circuit to operate said relay which in turn closes said second circuit to explode said gas into steam which condenses back into the solution and decreases the pressure upon said mercury to open said first circuit to release said relay and open said second circuit, and circuit means controlled by said relay.

4. In combination, a circuit and a switch for actuating said circuit for a short period at fixed intervals, said switch comprising a closed gas vessel, means for producing an explosive gas in said vessel at a fixed rate, and means operative when a certain amount of gas has been produced in said vessel for closing said circuit for a short interval and for exploding said gas.

5. An electric switch comprising a circuit, a closed glass vessel containing a solution for producing an explosive gas and a mercury column, means for causing a certain amount of gas to be produced from said solution, said vessel being so arranged that when said certain amount of gas has been produced it causes a certain movement of the mercury column, and means for exploding said gas and operating said circuit operative when said mercury column has completed said certain movement.

6. An electric switch comprising a circuit, a closed glass vessel containing a solution for producing an explosive gas, means for causing a certain amount of gas to be produced in said vessel from said solution, said vessel being so arranged that it is expanded a certain amount by said gas, and means operative in response to said certain expansion of the vessel for exploding said gas and operating said circuit.

JOSEPH W. DEHN.
OSCAR MYERS.